United States Patent
Sezaki

(10) Patent No.: US 10,751,759 B2
(45) Date of Patent: Aug. 25, 2020

(54) SORTING APPARATUS AND SORTING SYSTEM

(71) Applicants: KABUSHIKI KAISHA TOSHIBA, Minato-ku (JP); Toshiba Infrastructure Systems & Solutions Corporation, Kawasaki-shi (JP)

(72) Inventor: Kentaro Sezaki, Kawasaki (JP)

(73) Assignees: KABUSHIKI KAISHA TOSHIBA, Minto-ku (JP); Toshiba Infrastructure Systems & Solutions Corporation, Kawasaki-shi (JP)

(*) Notice: Subject to any disclaimer, the term of this patent is extended or adjusted under 35 U.S.C. 154(b) by 48 days.

(21) Appl. No.: 15/993,100

(22) Filed: May 30, 2018

(65) Prior Publication Data

US 2018/0354121 A1    Dec. 13, 2018

(30) Foreign Application Priority Data

Jun. 7, 2017   (JP) .................................. 2017-112332

(51) Int. Cl.
| | |
|---|---|
| B25J 9/16 | (2006.01) |
| B07C 5/34 | (2006.01) |
| B25J 19/02 | (2006.01) |
| B25J 9/06 | (2006.01) |
| B25J 15/06 | (2006.01) |
| B07C 5/36 | (2006.01) |
| B65G 61/00 | (2006.01) |

(52) U.S. Cl.
CPC .............. *B07C 5/3412* (2013.01); *B07C 5/36* (2013.01); *B25J 9/06* (2013.01); *B25J 9/1694* (2013.01); *B25J 15/0616* (2013.01); *B25J 19/021* (2013.01); *B07C 5/361* (2013.01); *B07C 2501/0063* (2013.01); *B65G 61/00* (2013.01)

(58) Field of Classification Search
CPC ........................... B25J 15/0616; B07C 5/3412
See application file for complete search history.

(56) References Cited

U.S. PATENT DOCUMENTS

| | | | |
|---|---|---|---|
| 5,217,344 A | 6/1993 | Gendrault et al. | |
| 6,502,877 B2 * | 1/2003 | Schick | B25J 15/06 294/185 |
| 9,102,055 B1 * | 8/2015 | Konolige | B25J 9/1671 |
| 9,333,649 B1 * | 5/2016 | Bradski | B25J 9/1697 |
| 9,561,587 B2 * | 2/2017 | Wellman | B25J 9/1612 |
| 9,785,911 B2 * | 10/2017 | Galluzzo | B25J 5/007 |

(Continued)

FOREIGN PATENT DOCUMENTS

| | | |
|---|---|---|
| DE | 33 02 177 A1 | 8/1983 |
| EP | 1 418 025 A2 | 5/2004 |

(Continued)

*Primary Examiner* — Thomas Randazzo
(74) *Attorney, Agent, or Firm* — Oblon, McClelland, Maier & Neustadt, L.L.P.

(57) ABSTRACT

According to one embodiment, a sorting apparatus includes a controller, a holding device, and a driver. The controller acquires holding position information corresponding to identification information of an article to be processed, and sets a holding position based on the holding position information. The holding device holds the article. The drive unit causes the holding device to hold the article in the holding position set by the controller, and moves the article held by the holding device.

5 Claims, 5 Drawing Sheets

(56) References Cited

U.S. PATENT DOCUMENTS

| | | | |
|---|---|---|---|
| 2003/0038491 A1* | 2/2003 | Schmalz | B25J 15/0616 |
| | | | 294/185 |
| 2010/0004778 A1* | 1/2010 | Arimatsu | B25J 9/1697 |
| | | | 700/214 |
| 2010/0078953 A1* | 4/2010 | Ban | B25J 15/0266 |
| | | | 294/106 |
| 2013/0085604 A1* | 4/2013 | Irie | B25J 9/1687 |
| | | | 700/258 |
| 2013/0096713 A1* | 4/2013 | Takizawa | B65G 61/00 |
| | | | 700/224 |
| 2014/0277721 A1* | 9/2014 | Tomo | B25J 9/1612 |
| | | | 700/253 |
| 2015/0066199 A1* | 3/2015 | Shimono | B25J 9/1687 |
| | | | 700/218 |
| 2015/0124056 A1* | 5/2015 | Ando | G06T 7/73 |
| | | | 348/46 |
| 2015/0127141 A1* | 5/2015 | Kawada | B25J 13/085 |
| | | | 700/206 |
| 2016/0167228 A1* | 6/2016 | Wellman | B25J 9/1697 |
| | | | 700/218 |
| 2016/0207195 A1* | 7/2016 | Eto | B25J 9/1612 |
| 2016/0228921 A1* | 8/2016 | Doublet | B07C 7/005 |
| 2016/0347558 A1* | 12/2016 | Eto | B65G 59/04 |
| 2017/0080566 A1* | 3/2017 | Stubbs | B25J 9/1679 |
| 2017/0129707 A1* | 5/2017 | Nakamoto | B65G 39/06 |
| 2017/0225330 A1* | 8/2017 | Wagner | B25J 9/1694 |
| 2018/0040132 A1* | 2/2018 | Eto | B65G 61/00 |
| 2018/0086489 A1* | 3/2018 | Rogers | B25J 15/02 |
| 2018/0178386 A1* | 6/2018 | Eto | B65G 59/04 |

FOREIGN PATENT DOCUMENTS

| | | |
|---|---|---|
| GB | 2 261 069 A | 5/1993 |
| JP | 2544833 | 10/1996 |
| JP | 9-290385 | 11/1997 |
| JP | 2008-49459 | 3/2008 |
| JP | 5288908 | 9/2013 |
| JP | 2016-132521 | 7/2016 |

* cited by examiner

SORTING APPARATUS AND SORTING SYSTEM

CROSS-REFERENCE TO RELATED APPLICATIONS

This application is based upon and claims the benefit of priority from Japanese Patent Application No. 2017-112332, filed Jun. 7, 2017; the entire contents of which are incorporated herein by reference.

FIELD

Embodiments described herein relate generally to a sorting apparatus and a sorting system.

BACKGROUND

In systems for delivering articles (packages) such as parcels, an operation of sorting collected packages into destinations is necessary. Such a system handles various packages that are different sizes, shapes, weights, materials, and strengths (non-uniform articles). Therefore, under present circumstances, many processes in the sorting work are carried out by manual labor. However, the sorting work to lift individual packages and move them to positions in accordance with their destinations is heavy work, and securing the human resources for this work has become more and more difficult in recent years. Therefore, automation of the sorting operation is desired. However, there is a problem in that the sorting apparatus cannot safely pick up and easily sort non-uniform articles. articles.

DETAILED DESCRIPTION

According to one embodiment, a sorting apparatus includes a controller, a holding device, and a driver. The controller acquires holding position information corresponding to identification information of an article to be processed, and sets a holding position based on the holding position information. The holding device holds the article. The drive unit causes the holding device to hold the article in the holding position set by the controller, and moves the article held by the holding device.

Hereinafter, the embodiments will be described with reference to the accompanying drawings.

First Embodiment

Figure 1:
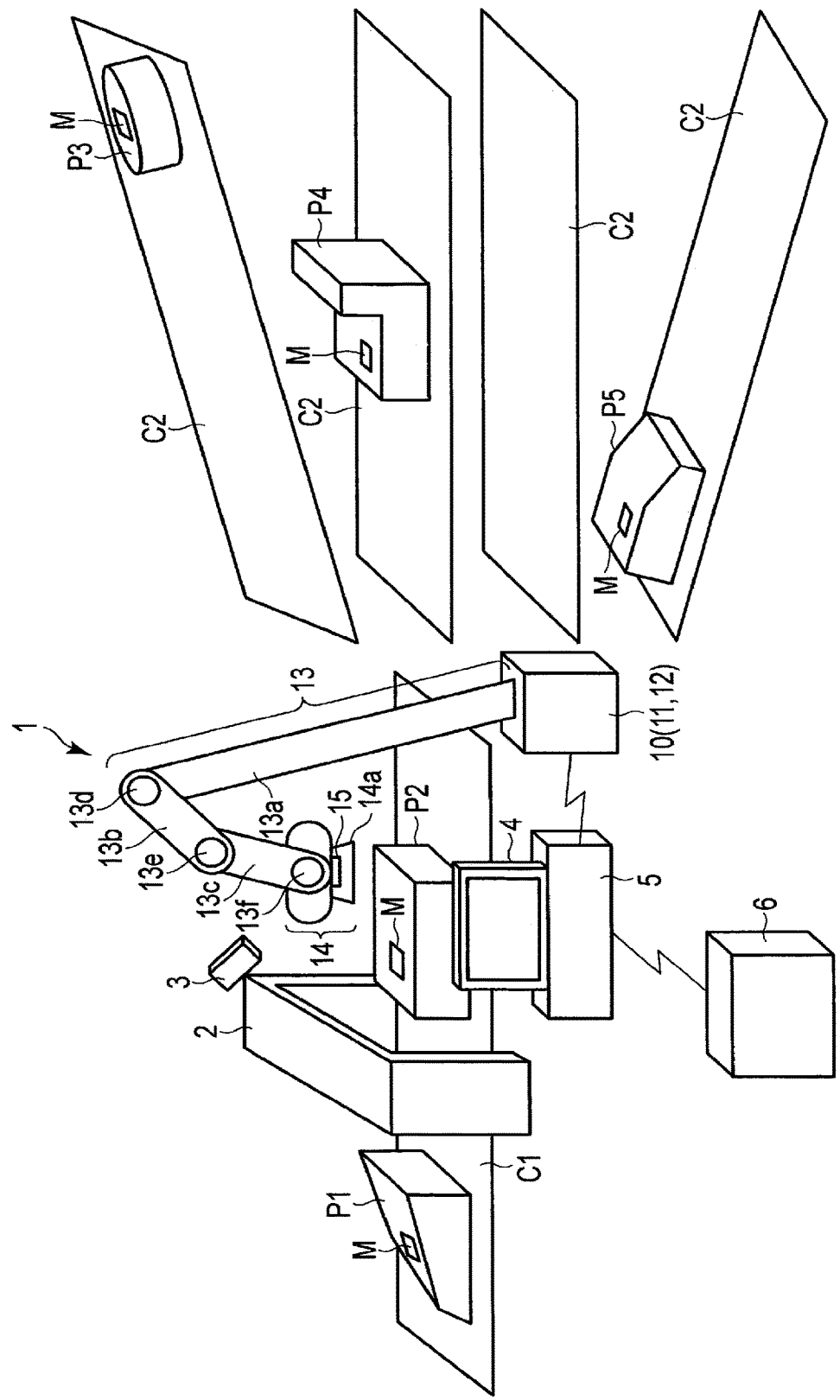
FIG. 1 is a diagram schematically showing a configuration example of a sorting system according to a first embodiment.

FIG. 1 is a diagram schematically showing a configuration example of a sorting system (a sorting apparatus) according to a first embodiment.

In the configuration example shown in FIG. 1, the sorting system includes a input conveyor C1, a plurality of sorting conveyors C2, a cargo-handling apparatus 1, a reading unit (reader) 2, an article detecting sensor 3, an operation panel (operation device) 4, a control apparatus (controller) 5, a host server 6, etc.

The sorting system shown in FIG. 1 sorts articles (packages) P that are conveyed by the input conveyor C1 (a supply section) into the sorting conveyors C2. The cargo-handling apparatus 1 and the control apparatus 5 function as the sorting apparatus which carries out an article sorting operation. The cargo-handling apparatus 1 and the control apparatus 5 may be integrally configured as one unit of the sorting apparatus. Alternatively, processing functions of the control apparatus 5, described later, may be performed by a controller of the cargo-handling apparatus 1. The cargo-handling apparatus 1 may be configured integrally with any of the reading unit 2, the article detecting sensor 3, or the operation panel 4.

The sorting system described above is applicable to, for example, a system for delivering a package to a destination. As an example of operation in this case, it is assumed that a plurality of sorting systems are provided in local sites to deliver the packages. In such an operation, one package may be sorted by a plurality of sorting systems. For example, one package is sorted by a first sorting system provided in a collecting station, and thereafter sorted by a second sorting system provided in a delivery center in a local site.

It is assumed that articles P (P1, P2, P3, P4, and P5) sorted by the sorting system are objects, such as parcels, which are not the same in size, shape, weight, material, or strength, as long as they meet a predetermined standard. The articles P are assumed to be different in size and shape, for example, as illustrated as articles P1 to P5 in FIG. 1, and are also assumed to be different in weight, material, and strength.

In the sorting system shown in FIG. 1, the article P to be sorted is set on the input conveyor C1. The input conveyor C1 conveys the set particle P. The article P placed on the input conveyor C1 passes through the reading unit 2, and is conveyed to an area where the cargo-handling apparatus 1 can hold the articles (a holding area). The input conveyor C1 functions as the supply section that supplies the article P to the holding area. The sorting system may have any configuration that can supply the articles to be sorted to the holding area, and is not limited to a configuration including a conveyor as the supply section. For example, the articles may be supplied to the holding area in a state of being stacked on a pallet, or being contained in a basket.

The cargo-handling apparatus 1 holds the article P and moves the held article P to designated positions. The cargo-handling apparatus 1 operates in accordance with instructions from the control apparatus 5. For example, the cargo-handling apparatus 1 holds the article P transferred by the input conveyor C1 and transfers the held article P to any one of the sorting conveyors C2.

The sorting conveyor C2 includes an unloading area (an unloading position) where the article P transferred by the cargo-handling apparatus 1 is unloaded. The unloaded position is not limited to the sorting conveyor, but may be a sorting basket, a working table, etc. A configuration example of the cargo-handling apparatus 1 will be described later in detail.

The reading unit 2 reads sorting information appended to the article P conveyed by the input conveyor C1. The sorting information includes identification information to identify the article P and information on the sorted place (for example, the destination, and the classification of the article). The sorting information is written on an invoice M adhered to the article P or directly on the article P. In the following, it is assumed that the sorting information is invoice information that is written on the invoice M adhered to the article P, and that a bar code indicating the identification information (for example, an invoice number) is printed on the invoice M. The sorting information is not limited to the bar code, but may be anything written by hand on the invoice, a stealth bar code, a two-dimensional code, or the like.

The reading unit 2 includes an image sensor (a reader), such as a camera or scanner, to read an image of the article P conveyed by the input conveyor C1. The reading unit 2 supplies the image of the article P read by the image sensor to the control apparatus 5. The reading unit 2 may include a bar-code reader that decodes the bar code, as the identification information, printed on the invoice M included in the read image of the article P. In this case, the reading unit 2 may supply to the control apparatus 5 the identification information (invoice number) as a result of decoding the bar code printed on the invoice M included in the read image of the article P.

The article detecting sensor 3 detects a state (characteristics) of the article. The article detecting sensor 3 is an image sensor, a distance sensor, a material property detection sensor, etc. The image sensor is a camera that captures an image of the article. The distance sensor is a sensor that measures a distance from a predetermined position to the article, and acquires a distance image. The image sensor and the distance sensor function as a shape measurement sensor which measures the shape of the article. The shape measurement sensor may be a sensor that measures an image by stereoscopic techniques with a plurality of cameras, or a sensor that measures a three-dimensional shape by laser scanning techniques. The material property detection sensor is a sensor (device) to measure a material property of the article. For example, the material property detection sensor may be a sensor that contactlessly detects a material property of the article, such as an X-ray fluorescence spectrometer or an infrared spectrophotometric measurement device, or a sensor that measures hardness or the like in direct contact with the article.

In this embodiment, the article detection sensor 3 includes an image sensor (a reader) that reads at least an image of the article. The image sensor as the article detecting sensor 3 acquires an image to measure the shape as characteristics of the article, detects a label, etc., and captures an image of an area including a holding position where the cargo-handling apparatus 1 holds the article P. Thus, the image sensor as the article detection sensor 3 also functions as a picking camera to monitor a state of holding the article by the cargo-handling apparatus 1. The image acquired (captured) by the image sensor as the article detection sensor 3 is used to control operations of the cargo-handling apparatus 1. The image sensor as the article detection sensor 3 may be adjusted in terms of an image capturing position, an image capturing angle, an image capturing magnification, etc. in accordance with instructions from the control apparatus 5.

Besides the invoice M, a label that indicates handling instructions, such as "THIS SIDE UP", "HANDLE WITH CARE", "FRAGILE" or the like, may be adhered to the article P. To detect such a label, the article detecting sensor 3 may acquire an image of the article P including the label and supply it to the control apparatus 5. Alternatively, the label adhered to the article P to be processed may be detected from an image of the article P read by the reading unit 2.

The operation panel 4 functions as a display unit (an information unit) to inform an operator and an operation unit, into which the operator inputs various operational instructions, of guidance (for example, an operating condition or operational guidance). For example, the operation panel 4 includes a display equipped with a touch panel. Thus, the operation panel 4 functions as an operation unit into which operational instructions for the sorting system are input, and allows the operator to, for example, designate the holding position where the cargo-handling apparatus 1 holds the article P.

The control apparatus 5 controls the entire sorting system. The control apparatus 5 is connected to the cargo-handling apparatus 1, the reading unit 2, the article detecting sensor 3, and the operation panel 4, and controls operations of those parts. The control apparatus 5 also has a function of communicating with the host server 6. For example, the control apparatus 5 determines the holding position where the cargo-handling apparatus 1 holds the article P, and sends an instruction about the holding position of the article P to the cargo-handling apparatus 1. The control apparatus 5 also determines the unloading position, which is the destination of the article P, and sends an instruction about information on the unloading position. The control apparatus 5 controls operations of the cargo-handling apparatus 1, and thus the cargo-handling apparatus 1 and the control apparatus 5 constitute the sorting apparatus to sort the article P.

The host server 6 is a management apparatus that manages information about the article P to be sorted by the sorting system. The host server 6 includes a database 6a that records information corresponding to identification information of each article P. For example, the host server 6 records in the database 6a in accordance with the identification information, information (holding position information) indicative of the position (the holding position) on the conveyor where the cargo-handling apparatus 1 should hold the article. The holding position information indicates the holding position with coordinate information based on, for example, an end of the article or an end of the invoice M adhered to the article. The host server 6 has a function of supplying the holding position information corresponding to the designated identification information to the control apparatus 5. The host server 6 may be connected to control apparatuses of a plurality of sorting systems, to manage information on the articles P sorted by the sorting systems A configuration of the cargo-handling apparatus 1 will be explained below.

In the configuration example shown in FIG. 1, the cargo-handling apparatus 1 includes a base unit 10, a controller 11, a drive unit (driver) 12, an arm unit 13, a holding unit (holding device) 14, and a sensor 15.

The base unit 10 includes the controller 11 and the drive unit 12. The base unit 10 also functions as a base that supports the arm unit 13.

The controller 11 controls operations of the cargo-handling apparatus 1. Furthermore, the controller 11 is connected to the control apparatus 5, receives operational instructions from the control apparatus 5, and supplies information detected by the sensor 15 to the control apparatus 5. Thus, the controller 11 performs control of operating the arm unit and the holding unit 14 in accordance with instructions from the control apparatus 5.

The drive unit 12 includes a drive mechanism, such as a motor, to operate the arm unit 13 and the holding unit 14, and also includes a drive circuit to drive the drive mechanism. The drive unit 12 drives the drive mechanism in accordance with a drive signal from the controller 11, thereby operating the arm unit 13 and the holding unit 14.

The arm unit 13 is a movement mechanism to move the holding unit 14. In the configuration example shown in FIG. 1, the arm unit 13 includes a plurality of arms 13a, 13b, and 13c, and a plurality of joints 13d, 13e, and 13f. The arms 13a, 13b, and 13c are connected with the joints. In the example shown in FIG. 1, the arms 13a and 13b are connected with the joint 13d, and the arms 13b and 13c are connected with the joint 13e. The arms 13a, 13b, and 13c are pivotally moved in various directions about the joints 13d, 13e, and 13f as fulcrums by the drive unit 12.

A base side of the connected arms (an end of the arm 13a) is supported by the base unit 10, and connected to the drive unit 12 of the base unit 10. A distal side of the connected arms (an end of the arm 13c) is connected to the holding unit 14 via the joint 13f. In the arm unit 13, the connected arms 13a, 13b, and 13c are moved in various directions from the base unit 10. Thus, the arm unit 13 moves the holding unit 14 to the unloading position of the sorting conveyor from an article holding position on the input conveyor.

The holding unit 14 includes a mechanism of holding the article. The holding unit 14 is provided at the distal end of the arm unit 13, and moves in three-dimensional space by operation of the arm unit 13. For example, the holding unit 14 holds the article P placed in the article holding position on the input conveyor, retains the held article P until it is moved to the unloading position, and releases the article P at the unloading position. In the configuration example shown in FIG. 1, the holding unit 14 includes a suction portion 14a, which suctions the article P, as a mechanism of holding the article. The suction portion 14a includes one or more suction cups (also referred to as suction pads) connected to a vacuum pump or the like that is driven by the drive unit 12. The holding unit 14 is connected to the distal end of the arm 13 via a joint to change an attitude of the suction portion 14a.

In this embodiment, the holding unit 14 is described as, but is not limited to, a unit that holds an article by suction. For example, the holding unit 14 may be a unit that holds an article by gripping (for example, a gripper unit including a finger-like tip portion that is openable and closable).

The sensor 15 to detect a state of holding the article P by the holding unit 14 (a holding state) in the holding unit 14 or near the holding unit 14 is provided. The sensor 15 can detect information indicative of whether the article is held in a stable condition, as information indicative of the holding state of the article. The sensor 15 may be any sensor that can detect information indicative of the holding state of the article P. For example, the sensor 15 is a force sensor, such as a pressure sensor, which detects force exerted on the holding section 14. The sensor 15 may be a multiple-axis force sensor. Alternatively, if the suction portion 14a is formed of a plurality of suction cups, the sensor 15 may be a one-axis force sensor provided on each of the suction cups. The sensor 15 may detect a tilt or deformation of the article P held by the holding unit 14.

The structures of the holding unit 14 and the arm unit 13 are shown in FIG. 1 as a mere example. The holding unit 14 and the arm unit 13 are not limited to the structures shown in FIG. 1. For example, the arm unit 13 may be constructed by connecting two arms, or four or more arms. Furthermore, a sensor to detect a material property of the article may be provided at a distal end side of the arm unit 13 (for example, near the holding unit 14). The movement mechanism exemplified as the arm unit 13 to move the holding unit 14 is not limited to that constructed by arms, but may be anything that can move the holding unit 14 from the article holding position on the input conveyor to the unloading position.

Next, a configuration of a control system in the control apparatus 5 functioning as a control unit of the sorting system (sorting apparatus) will be described.

Figure 2:
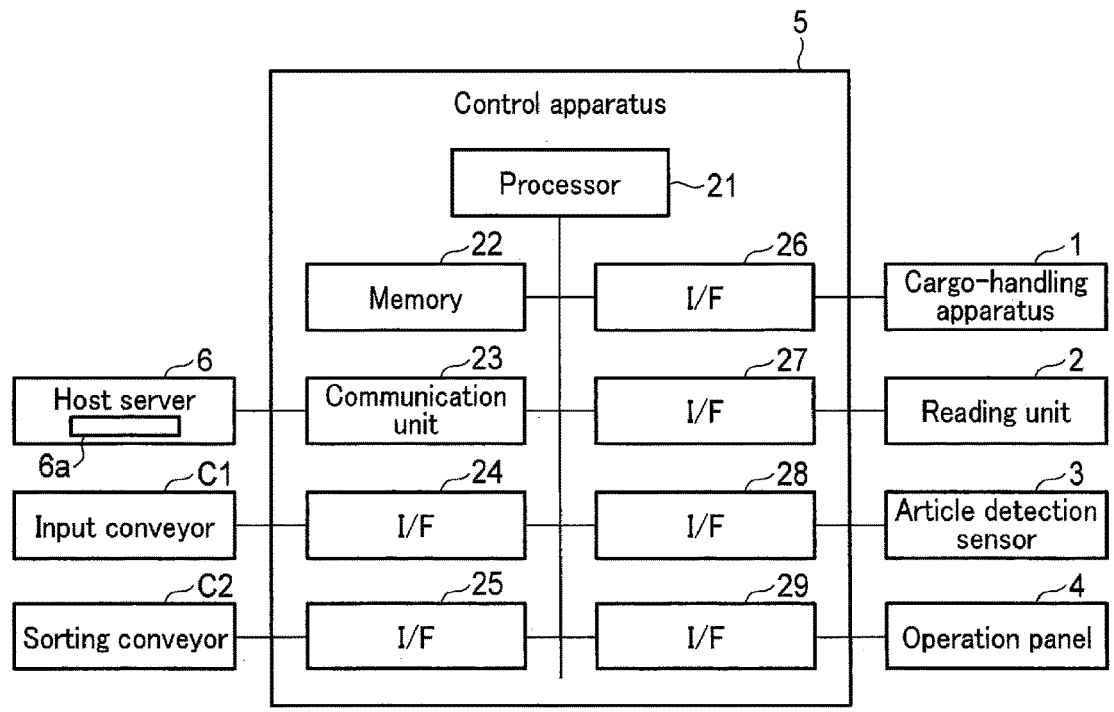
FIG. 2 is a block diagram showing a configuration example of a control system of a cargo-handling apparatus in the sorting system according to the first embodiment.

FIG. 2 is a block diagram showing a configuration example of the control system in the control apparatus 5 according to the first embodiment.

As shown in FIG. 2, the control apparatus 5 includes a processor 21, a memory 22, a communication unit (communication device) 23, and a variety of interfaces (I/F) 24 to 29.

The processor 21 controls the components of the apparatus and performs a variety of processing, such as arithmetic processing. The processor 21 is, for example, a CPU (Central Processing Unit), and performs a variety of processing functions by executing programs.

The memory 22 is a storage including a non-volatile memory to store the programs to be executed by the processor 21, and a volatile memory to temporarily store data for processing. Thus, the processor 21 and the memory 22 function as processing units.

The communication unit 23 is a unit for communicating with the host server 6. The I/F 24 is an interface connected to the input conveyor C1. The I/F 25 is an interface connected to the sorting conveyor C2. The I/F 25 is an interface connected to the cargo-handling apparatus 1. The I/F 25 is an interface connected to the reading unit 2. The I/F 25 is an interface connected to the article detecting sensor 3. The I/F 25 is an interface connected to the operation panel 4.

Figure 3:
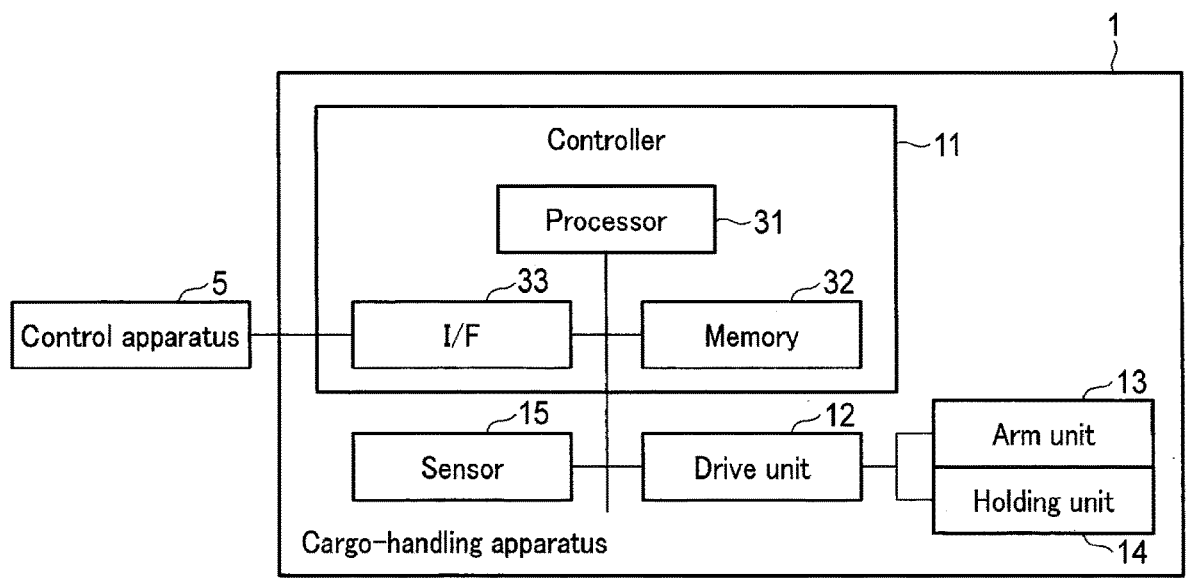
FIG. 3 is a block diagram showing a configuration example of a control system of a control apparatus in the sorting system according to the first embodiment.

FIG. 3 is a block diagram showing a configuration example of a control system of the cargo-handling apparatus 1 according to the first embodiment.

As shown in FIG. 3, the controller 11 of the cargo-handling apparatus 1 includes a processor 31, a memory 32, and an interface (I/F) 33. The drive unit 12 and the sensor 15 are connected to the processor 31 in the controller 11.

The processor 31 controls the components of the apparatus and performs a variety of processing, such as arithmetic processing. The processor 31 is, for example, a CPU (Central Processing Unit), and performs a variety of processing functions by executing programs.

The memory 32 is a storage including a non-volatile memory to store the programs to be executed by the processor 31, and a volatile memory to temporarily store data for processing. The processor 31 performs a variety of processing functions by executing programs. The I/F 33 is an interface connected to the control apparatus 5.

With the configuration described above, the processor 31 in the controller 11 controls operations of the arm unit 13 and the holding unit 14 by the drive unit 12 in accordance with instructions obtained from the control apparatus 5 via the I/F 33. The processor 31 also supplies information detected by the sensor 15 to the control apparatus 5.

A sorting process performed by the sorting system according to the first embodiment will be described next.

Figure 4:
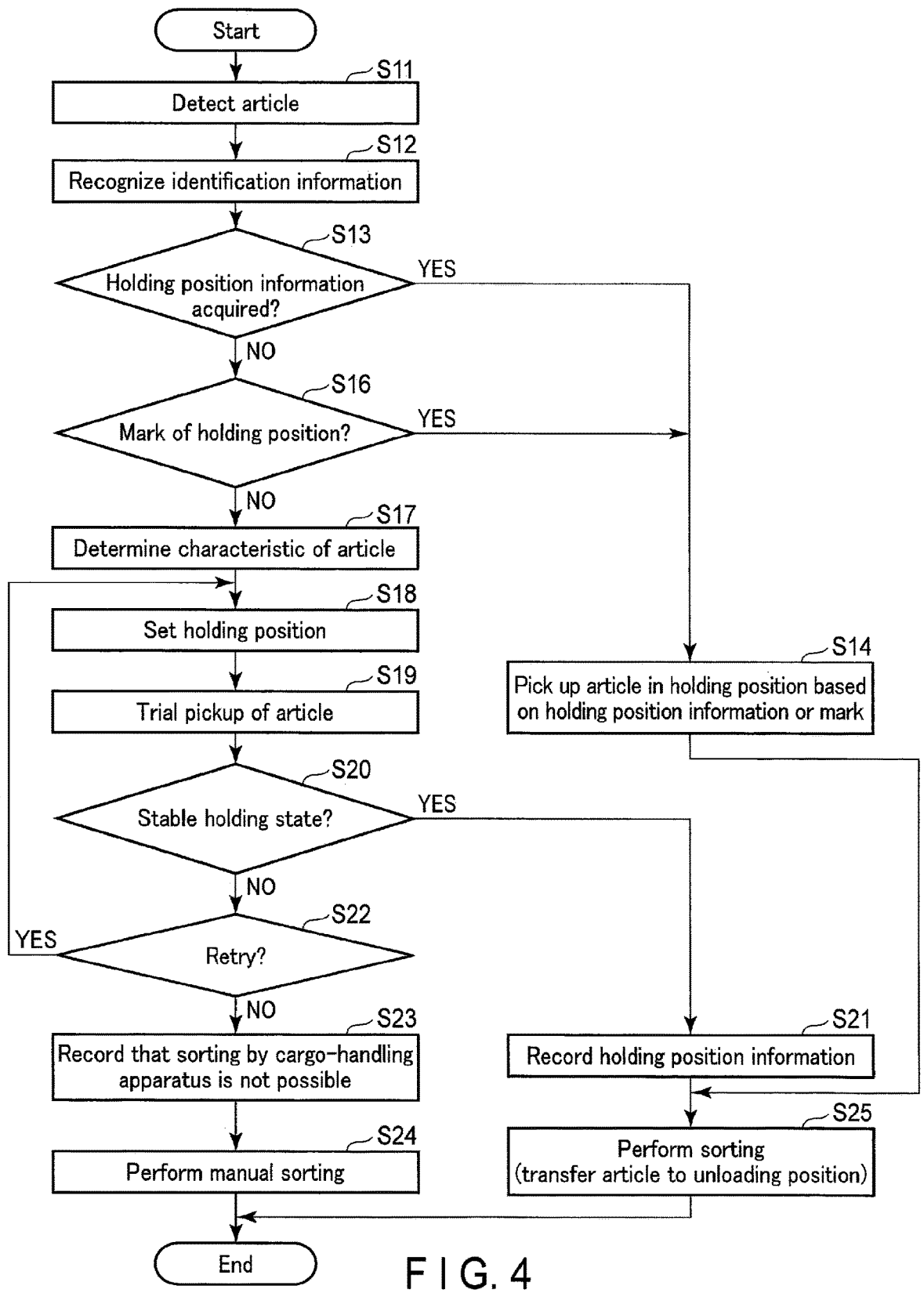
FIG. 4 is a flowchart for explaining a sorting process carried out by the sorting system according to the first embodiment.

FIG. 4 is a flowchart for explaining operations of the control apparatus 5 and the cargo-handling apparatus 1 as the sorting apparatus in the sorting process carried out by the sorting system according to the first embodiment.

In the sorting system, the article P is set on the input conveyor C1 in advance of the reading unit 2 with respect to a conveyance direction. For example, the article P is set on the input conveyor C1 so that the surface on which the invoice M is adhered is directed upward. The input conveyor C1 conveys the set article P to the reading unit 2. The reading unit 2 reads the image of the article P conveyed by the input conveyor C1. For example, the reading unit 2 reads the image of the article P including the invoice M by capturing the image of the article P on the input conveyor C1 from above by the image sensor. The reading unit 2 supplies the read image of the article P to the control apparatus 5.

The processor 21 of the control apparatus 5 detects the article P to be processed on the basis of the image supplied from the reading unit 2 (S11). Upon detection of the article P to be processed, the processor 21 extracts an image of the invoice M from the image of the article P supplied from the reading unit 2, and recognizes information (invoice information) described on the invoice M from the extracted image (S12). The invoice information includes at least the identification information of the article P. The identification information of the article P is assumed to be an invoice number represented by the bar code printed on the invoice M. In this case, the processor 21 recognizes the invoice number as the identification information by decoding the bar code included in the image of the invoice M. Alternatively, the reading unit 2 may decode the bar code printed on the invoice M, and supply the decoded invoice number to the control apparatus 5. In this case, the processor 21 acquires the invoice number from the reading unit 2.

Upon recognition of the invoice number of the article P, the processor 21 checks whether the holding position information corresponding to the invoice number of the article P is recorded (S13). For example, the processor 21 queries the holding position information corresponding to the invoice number of the article P from the host server 6, and acquires the holding position information corresponding to the invoice number from the host server 6. In this case, if the holding position information corresponding to the invoice number is recorded, the processor 21 acquires the holding position information from the host server 6. If the holding position information corresponding to the invoice number is not recorded, the processor 21 is informed from the host server 6 that the holding position information is not recorded.

In this embodiment, it is assumed that the holding position information corresponding to the invoice number is recorded in the database 6a of the host server 6. However, the holding position information indicative of the holding position of the article P may be written on the invoice M or on a surface of the article P. In this case, the processor 21 may extract an image area including the holding position information from the image of the article P, and recognize the holding position information from the extracted image area.

If the holding position information corresponding to the invoice number is acquired (S13, YES), the processor 21 determines the position where the cargo-handling apparatus 1 should hold the article P based on the acquired holding position information corresponding to the invoice number. Upon determination of the holding position based on the holding position information corresponding to the invoice number, the processor 21 supplies designation of the holding position of the article P to the cargo-handling apparatus 1.

Upon receipt of the designation of the holding position of the article P from the control apparatus 5, the controller 11 of the cargo-handling apparatus 1 moves the holding unit 14 to the designated holding position, and holds and picks up the article P.

In the state of picking up the article P in the designated holding position, the processor 21 may determine whether or not the holding state of the article P by the cargo-handling apparatus 1 is stable, as in the step of S20 to be described later. If the holding state of the article P is not stable, the processor 21 of the control apparatus 5 may proceed to S18 or S23 to be described later, because the holding state in the holding position determined on the basis of the holding position information is unstable.

Furthermore, the processor 21 of the control apparatus 5 designates the sorting conveyor C2 including the destination of the article P (the unloading position), and instructs the cargo-handling apparatus 1 to transfer the article P to the unloading position (S25). The controller 11 of the cargo-handling apparatus 1, which designates the sorting conveyor C2 as the destination, moves the picked-up article P to the unloading position of the sorting conveyor designated by the control apparatus 5, and releases the article P in the unloading position.

For example, the processor 21 of the control apparatus 5 acquires the information indicative of the destination corresponding to the invoice number from the host server 6, and determines the unloading position as the destination based on the acquired information. The processor 21 may recognize character information indicative of the address as the destination from the image of the invoice M of the article P, and may determine the unloading position as the destination in accordance with the address.

If the holding position information corresponding to the invoice number is not acquired (S13, NO), the processor 21 determines whether the article P bears a mark indicative of the holding position (S16). For example, the processor 21 detects a mark indicative of the holding position in the image of the article P acquired from the reading unit 2. The mark indicative of the holding position may be a specific label (a marking label), or a mark directly written on the article P. If the mark indicative of the holding position is detected (S16, YES), the processor 21 determines the holding position based on the position of the detected mark, and supplies designation of the holding position of the article P to the cargo-handling apparatus 1 (S14). As a result, the controller 11 of the cargo-handling apparatus 1 causes the holding unit 14 to move to the holding position designated by the control apparatus 5, and holds and picks up the article P.

If the mark indicative of the holding position is not detected (S16, NO), the processor 21 determines a characteristic of the article P to determine the holding position of the article P (S17). The processor 21 detects the article P with the article detecting sensor 3, and determines the characteristic of the article P based on the information detected by the article detecting sensor 3.

For example, the processor 21 detects a label that indicates handling instructions (for example, "THIS SIDE UP", "HANDLE WITH CARE", "FRAGILE") in the image of the article P detected by an image sensor as the article detecting sensor 3, and determines the characteristic of the article P based on the type of the detected label.

The processor 21 detects the shape of the article P by a shape measurement sensor as the article detecting sensor 3, and determines the shape as the characteristic of the article P. The processor 21 detects the material property of the article P by a material property detection sensor as the article detecting sensor 3, and determines the material property as the characteristic of the article P. The processor 21 may recognize information written on the invoice M (information such as the article name), and determine the characteristic of the article P based on the information written on the invoice M.

Upon determination of the characteristic of the article P, the processor 21 sets a holding position (an initial holding position) corresponding to the characteristic of the article P (S18). For example, the processor 21 sets an initial holding position with reference to a center of a holding surface of the article P (for example, an upper surface of the article bearing the label of "THIS SIDE UP" or a surface of a material property that can be easily suctioned by the suction portion 14a). The surface of a material property that can be easily suctioned by the suction portion 14a is, for example, a flat and smooth surface which does not have holes and which cannot be easily deformed even if a negative pressure is applied to the surface.

The processor 21 may estimate a position of the center of gravity of the article P, and set an initial holding position with reference to the estimated position of the center of gravity. Alternatively, the holding position may be instructed by the operator using the operation panel 4 or the like. In this case, the processor 21 may display the image of the article P on the operation panel 4 to receive the instruction for the holding position from the operator.

Upon setting the holding position, the processor 21 makes a trial pickup of the article P by the cargo-handling apparatus 1 (S19). The processor 21 sends instructions for the holding position and the trial pickup of the article to the cargo-handling apparatus 1. Upon receiving the instructions for the trial pickup of the article, the controller 11 of the cargo-handling apparatus 1 holds and picks up the article P in the holding position instructed from the control apparatus 5. When picking up the article, the controller 11 of the cargo-handling apparatus 1 supplies a signal detected by the sensor 15 to the control apparatus 5.

In the state in which the cargo-handling apparatus 1 is holding the article P, the processor 21 of the control apparatus 5 determines whether or not the holding state of the article P by the cargo-handling apparatus 1 is stable (S20). The processor 21 of the control apparatus 5 acquires the information detected by the sensor 15 via the controller 11 of the cargo-handling apparatus 1, and determines whether or not the holding state of the article P by the cargo-handling apparatus 1 is stable, based on the information detected by the sensor 15.

For example, in a case where the sensor 15 is a pressure sensor which detects a pressure value on the suction portion 14a of the holding unit 14, the processor 21 determines whether or not the holding state is stable based on the pressure value detected by the pressure sensor as the sensor 15. In this case, the processor 21 may be configured to determine that the suction (hold) of the article P is stable if the pressure value detected by the sensor 15 is smaller than a threshold, and unstable if the pressure value detected by the sensor 15 is equal to or greater than the threshold.

In a case where a plurality of pressure sensors are provided as the sensor 15, the processor 21 may be configured to determine that the holding state is unstable if there is spatial unevenness (gradient of the pressure values) in the pressures detected by the pressure sensors.

In a case where the sensor 15 includes a sensor that detects an inclination of the article P, the processor 21 may be configured to determine that the holding state is stable if the inclination of the held article P is smaller than a threshold, and unstable if the inclination of the held article P is equal to or greater than the threshold.

The method for determining whether the holding state is stable or unstable is not limited to the example described above. For example, the conditions for determining that the holding state is stable may be relaxed. Also, the article detecting sensor 3 may detect conditions (for example, an attitude or movement) of the held article, and the processor 21 may determine whether the holding state of the article P is stable or unstable based on the information detected by the article detecting sensor 3.

Also, whether or not the holding state of the article P by the holding unit 14 is stable may be determined by the controller 11 of the cargo-handling apparatus 1. In this case, the controller 11 of the cargo-handling apparatus 1 may inform the control apparatus 5 of the information on whether the holding state of the article P is stable or unstable.

If the holding state is determined to be stable in the determination step described above (S20, YES), the processor 21 records the holding position information indicative of the holding position of the article P in association with the identification information (the invoice number) of the article P (S21). For example, the processor 21 of the control apparatus 5 requests the host server 6 to record the holding position information corresponding to the invoice number. The host server 6 records the holding position information corresponding to the invoice number in the database 6a in accordance with the request from the control apparatus 5.

If the processor 21 determines that the holding state is stable (S20, YES), it designates the sorting conveyor C2 including the destination of the article P (the unloading position) and instructs the cargo-handling apparatus 1 to transfer the article P to the unloading position (S25). In accordance with this instruction, the controller 11 of the cargo-handling apparatus 1 moves the picked up article P to the designated unloading position, and releases the article P in the unloading position. As a result, the article P is held by the cargo-handling apparatus 1 in the stable state and transferred to the unloading position.

If the processor 21 determines that the holding state is unstable (S20, NO), it determines whether or not the pickup of the article P should be retried (S22). If the processor 21 determines that the pickup of the article P should be retried (S22, YES), the processor 21 changes the holding position (S18), causes the cargo-handling apparatus 1 to make a trial pickup of the article P again (S19), and determines the holding state (S20).

The method of changing the holding position includes a method of determining a new holding position at random, and a method of determining a new holding position with reference to a detection result obtained from the sensor 15. The former is advantageous in that the amount of calculation is less. The latter may be a method of shifting the holding position toward a side where the pressure value is smaller or toward a side where the inclination of the article is smaller. The amount of shift (offset) may be set in advance, or may be determined in accordance with the size of a surface detected by the sensor.

If the processor 21 determines that the pickup should not be retried (S22, NO), it determines that pickup of the article P by the cargo-handling apparatus 1 is not possible, and records that pickup of the article P by the cargo-handling apparatus 1 is not possible in association with the identification information (the invoice number) of the article P (S23). For example, the processor 21 of the control apparatus 5 requests the host server 6 to record that pickup by the cargo-handling apparatus 1 is not possible in association with the invoice number. The host server 6 records that pickup by the cargo-handling apparatus 1 is not possible in association with the invoice number in the database 6a in accordance with the request from the control apparatus 5.

Furthermore, if the processor 21 determines that pickup of the article P by the cargo-handling apparatus 1 is not possible, it informs the operator via the operation panel 4 that pickup by the cargo-handling apparatus 1 is not possible, and prompts the operator to manually sort the article P (S24). In this case, the operator carries out the sorting operation for the article P.

The sorting system according to the first embodiment described above acquires holding position information recorded in association with the identification information of the article, and the cargo-handling apparatus holds the article in the holding position based on the acquired holding position information to carry out the sorting operation. Therefore, according to the sorting system of the first embodiment, the article can be held in the holding position designated in advance, so that the sorting operation can be realized by holding the article in a stable or safe holding position. Furthermore, according to the sorting system of the first embodiment, with regard to an article whose holding position information is recorded, the system need not determine a holding position of the article. Therefore, the sorting process can be accelerated.

Furthermore, according to the sorting system of the first embodiment, with regard to an article whose holding position information is not recorded, the system determines a holding position for stably holding the article by making a trial pickup. If a holding position for stably holding the article is determined, the holding position is recorded in association with the identification information of the article. Thus, if the article is further sorted by another sorting system, the holding position for stably holding the article can be acquired from the identification information of the article. Therefore, the sorting process in the other sorting system can be accelerated.

Second Embodiment

A second embodiment will be explained next.

Figure 5:
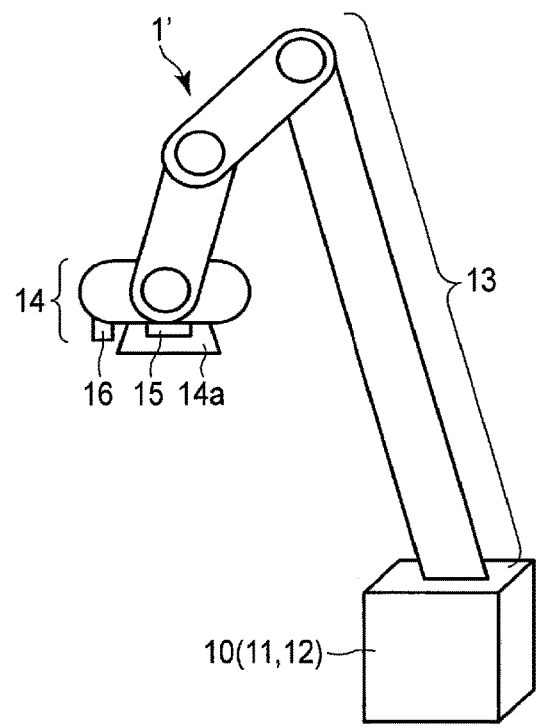
FIG. 5 is a diagram schematically showing a configuration example of a cargo-handling apparatus in a sorting system according to a second embodiment.

FIG. 5 is a diagram schematically showing a configuration example of a cargo-handling apparatus 1' in a sorting system according to a second embodiment.

The sorting system according to the second embodiment has a configuration in which a printing unit is added to the cargo-handling apparatus shown in FIG. 1 described above in relation to the first embodiment. In other words, the sorting system of the second embodiment has the configuration in which the cargo-handling apparatus 1 shown in FIG. 1 is replaced with the cargo-handling apparatus 1' shown in FIG. 5. Thus, in the sorting system of the second embodiment, a reading unit 2, an article detecting sensor 3, an operation panel 4, a control apparatus 5, and a host server 6 can be implemented by the hardware configuration of the first embodiment described above. Therefore, detailed explanations for the configuration will be omitted.

The cargo-handling apparatus 1' shown in FIG. 5 includes a base unit 10, a controller 11, a drive unit 12, an arm unit 13, a holding unit 14, and a sensor 15, and a printing unit (printer) 16. The base unit 10, the controller 11, the drive unit 12, the arm unit 13, the holding unit 14, and the sensor 15 can be implemented by the hardware configuration similar to that of the cargo-handling apparatus 1 shown in FIG. 1. Therefore, these elements are denoted by the same reference symbols as those used in FIG. 1, and detailed explanations thereof will be omitted.

The printing unit 16 prints a mark indicative of a holding position of the holding unit 14 on the article. Printing by the printing unit 16 on the article is controlled by the controller 11. The printing unit 16 comprises a printing mechanism of, for example, an ink-jet system or a thermal transfer system. The printing unit 16 may be anything that can print a mark on the article P, and is not limited to a specific printing system. The mark printed by the printing unit 16 may be anything that can be read by the reading unit 2 or the article detecting sensor 3. Therefore, the printing unit 16 may be configured to print the mark on the article P with an image forming material that is invisible to the human eye.

Furthermore, it is assumed that the printing unit 16 prints the mark indicative of the holding position on the article P while the holding unit 14 is holding the article P. The printing unit 16 may be configured to print a mark indicative of a position (holding position) where the holding unit 14 held the article P, after the holding unit 14 released the article P.

The printing unit 16 may be replaced by another unit that can put a mark indicative of the holding position on the article P. For example, the printing unit 16 may be replaced by a unit that adheres a label or the like indicative of the holding position to the article.

Figure 6:
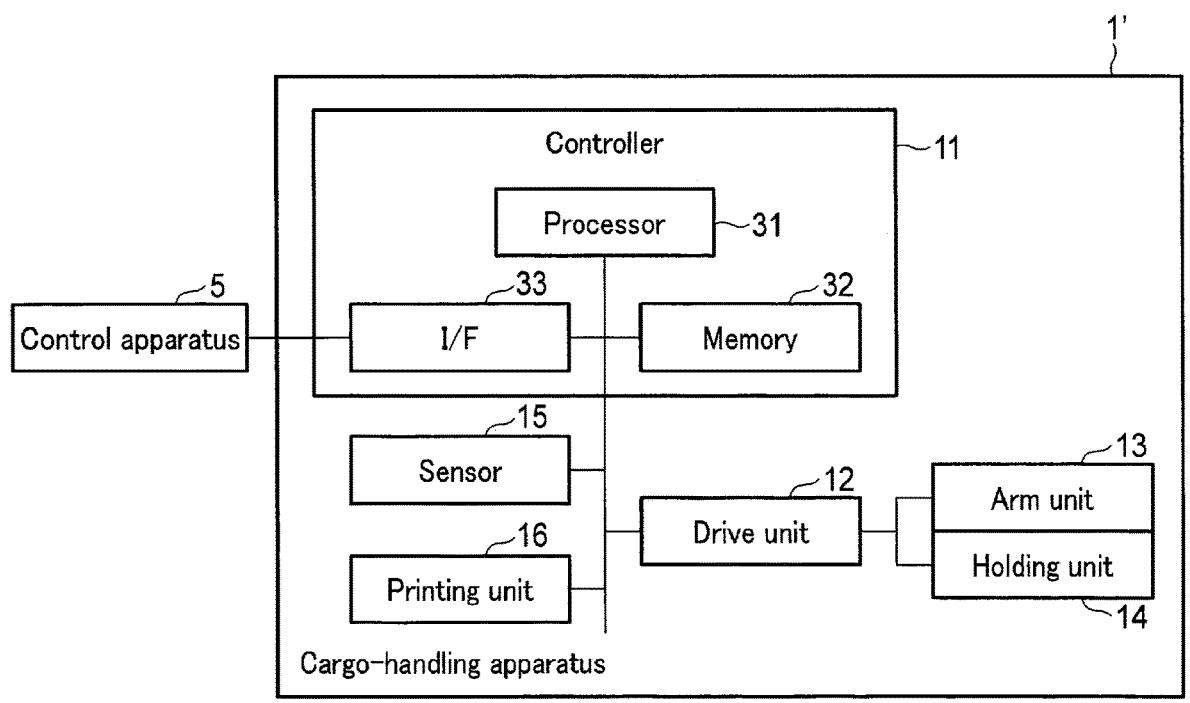
FIG. 6 is a block diagram showing a configuration example of a control system of the cargo-handling apparatus in the sorting system of the second embodiment.

FIG. 6 is a block diagram showing a configuration example of a control system of the cargo-handling apparatus 1' according to the second embodiment.

The cargo-handling apparatus 1' shown in FIG. 6 has a configuration in which the printing unit 16 is added to the cargo-handling apparatus 1 shown in FIG. 3 described above in relation to the first embodiment. In the configuration of the cargo-handling apparatus 1', the controller 11 includes a processor 31, a memory 32, and an interface (I/F) 33. The processor 31 in the controller 11 is connected to the drive unit 12, the sensor 15, and the printing unit 16. With the configuration shown in FIG. 6, the processor 31 can control processing of printing on the article P by the printing unit 16.

A sorting process performed by the sorting system according to the second embodiment will be described next.

Figure 7:
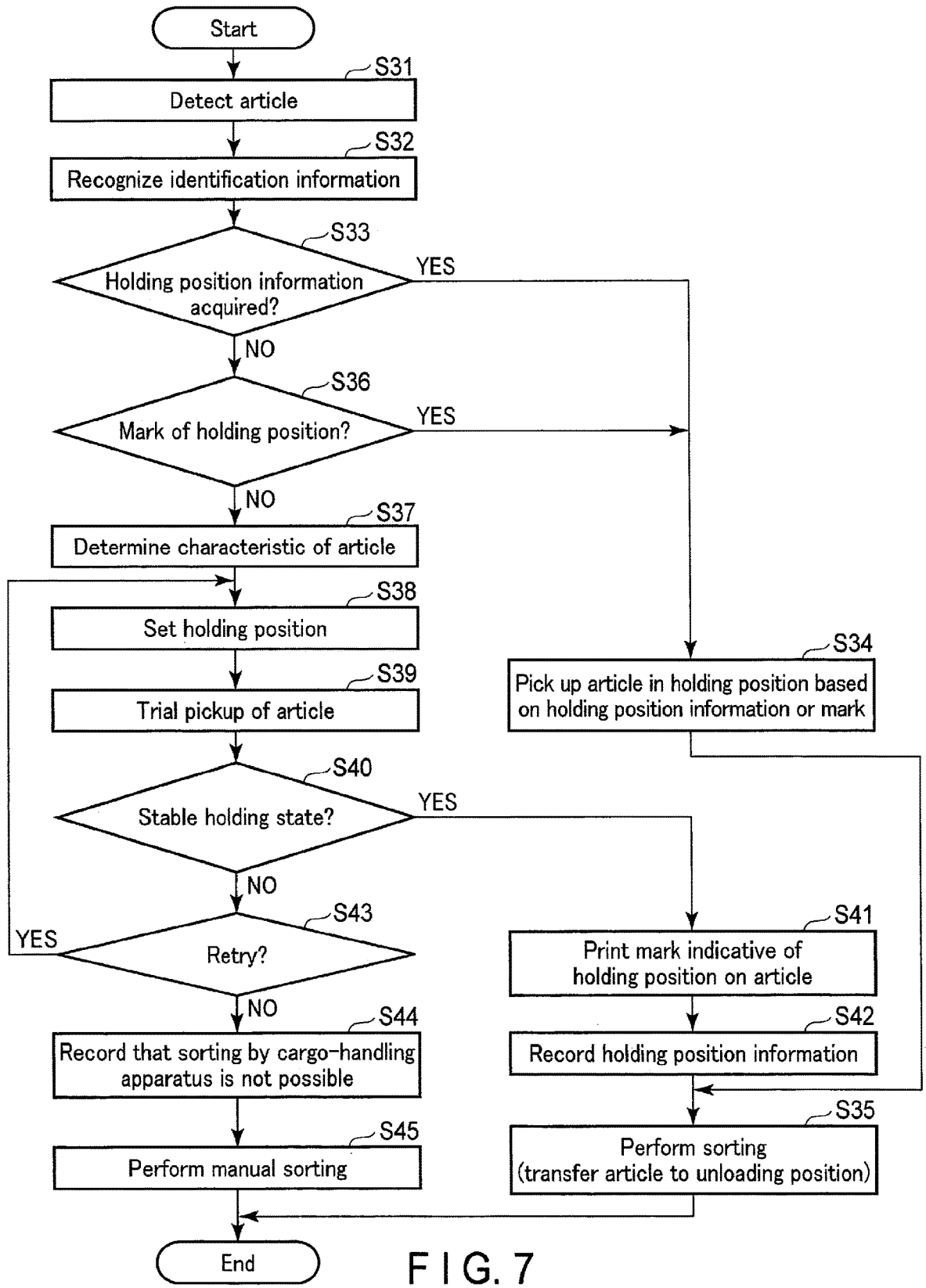
FIG. 7 is a flowchart for explaining a sorting process carried out by the sorting system according to the second embodiment.

FIG. 7 is a flowchart for explaining operations of the control apparatus 5 and the cargo-handling apparatus 1' in the sorting process carried out by the sorting system according to the second embodiment.

In the sorting process shown in FIG. 7, the steps other than S41, namely the steps S31 to S40 and S42 to S45, can be implemented by processing similar to that of S11 to S24 shown in FIG. 4 in connection with the first embodiment described above. Therefore, detailed explanations thereof will be omitted.

The input conveyor C1 conveys the article P to be processed to the reading unit 2. The reading unit 2 reads an image of the article P conveyed by the input conveyor C1, and supplies the read image of the article to the control apparatus 5. The processor 21 of the control apparatus 5 detects the article P based on the image supplied from the reading unit 2 (S31), and recognizes invoice information as identification information written on an invoice M adhered to the article P (S32). Upon recognition of the invoice number, the processor 21 performs processing of acquiring the holding position information corresponding to the invoice number (S33).

If the holding position information corresponding to the invoice number is acquired (S33, YES), the processor 21 determines the holding position based on the holding position information corresponding to the invoice number, and supplies designation of the holding position and the unloading position to the cargo-handling apparatus 1' (S34 and S35). As a result, the controller 11 of the cargo-handling apparatus 1' causes the holding unit 14 to move to the designated holding position, and holds and picks up the article P. After the holding unit 14 holding the article P is moved to the designated unloading position, it releases the article P.

If the holding position information corresponding to the invoice number is not acquired (S33, NO), the processor 21 determines whether the article P bears a mark indicative of the holding position (S36). If the mark indicative of the holding position is detected (S36, YES), the processor 21 determines the holding position based on the position of the detected mark, and supplies designation of the holding position and the unloading position of the article P to the cargo-handling apparatus 1' (S34 and S35). Accordingly, the controller 11 of the cargo-handling apparatus 1' causes the article P to be picked up in the holding position, and released in the unloading position.

If the mark indicative of the holding position is not detected (S36, NO), the processor 21 determines a characteristic of the article P (S37), and sets a holding position (an initial holding position) in accordance with the characteristic of the article P (S38). As in the first embodiment, the holding position may be set by an instruction of the operator via the operation panel 4 or the like.

Upon setting the holding position, the processor 21 makes a trial pickup of the article P by the cargo-handling apparatus 1' (S39). Upon making the trial pickup of the article P, the processor 21 of the control apparatus 5 determines whether or not the holding state of the article P by the cargo-handling apparatus 1 is stable (S40).

If the processor 21 determines that the holding state of the picked up article P is stable (S40, YES), it performs printing of the mark indicative of the holding position on the article P (S41). In other words, if the processor 21 determines that the holding state is stable, it instructs the cargo-handling apparatus 1' to print the holding position. The controller 11 of the cargo-handling apparatus 1' causes the printing unit to print the mark indicative of the position held by the holding unit 14 (the holding position) on the article P in accordance with the instruction from the control apparatus 5. The controller 11 of the cargo-handling apparatus 1' executes the printing of the mark by the printing unit 16 while the holding unit 14 is holding the article P. The controller 11 of the cargo-handling apparatus 1' may execute the printing of the mark by the printing unit 16 after the holding unit 14 releases the picked-up article P in the unloading position.

If the processor 21 of the control apparatus 5 determines that the holding state of the picked up article P is stable (S40, YES), it also executes processing of recording the holding position information indicative of the holding position in association with the identification information (the invoice number) of the article P (S42). In the second embodiment, since the mark indicative of the holding position is printed on the article P, the processing of recording the holding position information in association with the identification information may be omitted.

At the same time as instructing the printing of the mark indicative of the holding position of the article P, where the holding position is determined to be stable, the processor 21 instructs the cargo-handling apparatus 1' to transfer the article P to the unloading position (S35). Accordingly, the controller 11 of the cargo-handling apparatus 1' causes the article P held by the holding unit 14 to be moved to the unloading position designated by the control apparatus 5, and released in that position.

If the processor 21 determines that the holding position is unstable (S40, NO), it determines whether or not the pickup of the article P is retried (S43). If it is determined that the pickup should be retried (S43, YES), the processor 21 changes the setting of the holding position (S38) and proceeds to S39 again. If the processor 21 determines that the pickup should not be retried (S43, NO), it determines that pickup of the article P by the cargo-handling apparatus 1' is not possible, records that pickup of the article P by the cargo-handling apparatus 1' is not possible in association with the identification information (the invoice number) of the article P (S44), and prompts the operator to manually sort the article P (S44).

The sorting system of the second embodiment described above performs the trial pickup of the article held in the holding position set in accordance with the characteristic or the like of the article, and prints on the article the holding position, in which the holding state is determined to be stable. Thus, if the article is sorted by another sorting system, the holding position for stably holding the article can be specified by the mark printed on the article. Therefore, the sorting process in the other sorting system can be accelerated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A sorting apparatus comprising:
a controller configured to:
acquire an image of an article to be processed,
detect a mark indicative of a holding position from the image of the article, and
set the holding position based on the mark;
a holding device that holds the article;
a driver configured to:
cause the holding device to hold the article in the holding position set by the controller based on the mark, and
move the article held by the holding device;
a printer;
wherein the controller is configured to, when the mark is not detectable:
determine a holding position that enables the holding device to pick up the article, and
control the printer to print a mark indicative of the holding position on the article where the controller determined that pickup of the article is enabled.

2. The sorting apparatus according to claim 1,
wherein the controller is configured to, when the mark is not detectable:
determine a holding position that enables the holding device to pick up the article, and
control the printer to print a mark indicative of the holding position on the article where the controller determined that pickup of the article is enabled.

3. The sorting apparatus according to claim 1, wherein the holding device includes a suction portion that sucks the article.

4. A sorting system comprising:
a reader that reads an image of an article to be processed;
a cargo-handling apparatus that holds and moves the article; and
a control apparatus that supplies operation instructions to the cargo-handling apparatus, wherein
the control apparatus includes:
 a processor configured to:
  detect a mark indicative of a holding position from the image of the article read by the reader, and
  set the holding position based on the mark to the cargo-handling apparatus; and
the cargo-handling apparatus includes:
 a holding device that holds the article;
 a driver configured to:
  cause the holding device to hold the article in the holding position set by the control apparatus based on the mark, and
  move the article held by the holding device; wherein
the cargo-handling apparatus further includes a printer; and
the processor of the control apparatus is configured to, when the mark is not detectable:
 determine a holding position that enables pickup of the article, and
 control the printer to print a mark indicative of the holding position on the article where the control apparatus determined that pickup of the article is enabled.

5. The sorting system according to claim 4, wherein
the processor of the control apparatus is configured to, when the mark is not detectable:
 determine a holding position that enables pickup of the article, and
 control the printer to print a mark indicative of the holding position on the article where the control apparatus determined that pickup of the article is enabled.

* * * * *